US009811161B2

(12) United States Patent
Jönsson et al.

(10) Patent No.: US 9,811,161 B2
(45) Date of Patent: Nov. 7, 2017

(54) IMPROVING READABILITY OF CONTENT DISPLAYED ON A SCREEN

(71) Applicant: Telefonaktiebolaget LM Ericsson (publ), Stockholm (SE)

(72) Inventors: Tomas Jönsson, Luleå (SE); Tommy Arngren, Södra Sunderbyn (SE); Stefan Wänstedt, Luleå (SE); Peter Ökvist, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/107,348

(22) PCT Filed: Apr. 5, 2016

(86) PCT No.: PCT/EP2016/057384
§ 371 (c)(1),
(2) Date: Jun. 22, 2016

(65) Prior Publication Data
US 2017/0285740 A1    Oct. 5, 2017

(51) Int. Cl.
*G06F 3/01*        (2006.01)
*G06F 3/0346*    (2013.01)
(Continued)

(52) U.S. Cl.
CPC ............ *G06F 3/013* (2013.01); *G06F 3/0304* (2013.01); *G06F 3/0346* (2013.01); *G06T 3/40* (2013.01);
(Continued)

(58) Field of Classification Search
CPC .... G06F 3/013; G06F 32/0346; G06F 3/0304; G09G 5/26; G09G 2340/14; G09G 2340/145; G09G 2340/045; G06T 3/40
See application file for complete search history.

(56) References Cited

U.S. PATENT DOCUMENTS 5,731,805 A * 3/1998 Tognazzini ............. G06F 3/013
345/156
8,736,692 B1   5/2014 Wong et al.
(Continued)

FOREIGN PATENT DOCUMENTS

EP       0 816 983 A2   1/1998
WO    WO 2015/124098 A1   8/2015

OTHER PUBLICATIONS

International Search Report and Written Opinion of the International Searching Authority, Application No. PCT/EP2016/057384, dated Dec. 8, 2016.

*Primary Examiner* — Gregory J Tryder
*Assistant Examiner* — Diane Wills
(74) *Attorney, Agent, or Firm* — Sage Patent Group

(57) ABSTRACT

A device for improving readability of content displayed to a viewer is provided. The device has a screen for displaying the content, a motion sensor for measuring a displacement, and an eye tracker for measuring a change in gaze of the viewer when gazing at the screen. The device is operative to adjust the displayed content so as to improve its readability in response to determining that the change in gaze and the displacement of the device are out-of-sync. The out-of-sync condition may be determined by deriving a phase difference between the measured change in gaze and the measure displacement of the device, and comparing the derived phase difference to a threshold value. The displayed content is adjusted by at least one of increasing a font size of displayed text, enlarging one or more displayed graphical objects, and increasing a zoom level of the displayed content.

26 Claims, 3 Drawing Sheets

(51) Int. Cl.
*G09G 5/26* (2006.01)
*G06T 3/40* (2006.01)
*G06T 7/00* (2017.01)
*G06F 3/03* (2006.01)

(52) U.S. Cl.
CPC ............ *G06T 7/0022* (2013.01); *G09G 5/26* (2013.01); *G06T 2207/30201* (2013.01); *G09G 2340/045* (2013.01); *G09G 2340/14* (2013.01); *G09G 2380/10* (2013.01)

(56) References Cited

U.S. PATENT DOCUMENTS

| | | | |
|---|---|---|---|
| 2004/0100419 A1* | 5/2004 | Kato | G09G 5/00 345/7 |
| 2012/0235884 A1* | 9/2012 | Miller | G02B 27/0093 345/8 |
| 2013/0009962 A1 | 1/2013 | Lindfors | |
| 2015/0002392 A1 | 1/2015 | Kempinski | |
| 2015/0235084 A1 | 8/2015 | Cho | |
| 2015/0346818 A1* | 12/2015 | Kempinski | G06F 3/013 345/156 |

\* cited by examiner

IMPROVING READABILITY OF CONTENT DISPLAYED ON A SCREEN

CROSS REFERENCE TO RELATED APPLICATION

This application is a 35 U.S.C. §371 national stage application of PCT International Application No. PCT/EP2016/057384, filed on Apr. 5, 2016, the disclosure and content of which is incorporated by reference herein in its entirety.

TECHNICAL FIELD

The invention relates to a device for improving readability of content displayed to a viewer, a method of improving readability of content displayed to a viewer, a corresponding computer program, and a corresponding computer program product.

BACKGROUND

With the increasing use of screen-based devices, in particular handheld devices such as mobile phones, smartphones, and tablet computers or tablets, the issue of screen readability has become more prominent, for at least the following reasons. Firstly, the size of screens which are provided as displays with this class of devices is limited so as to enable users to accommodate their devices in a pocket of their shirt, jacket, or trousers, or to be carried in a briefcase. As a consequence, the size of displayed content is limited. In particular, this limits the range of font sizes which are reasonable for displaying text the screen of such a device. Second, readability is negatively affected by inadvertent displacements of the device, such as vibrations or sudden movements, relative to the user's eye or eyes gazing at the screen. The issue of inadvertent displacements or vibrations has emerged due to the increasing use of handheld devices while walking, driving in a car, riding the bus or train, and the like.

The human eye is able to track the movements or acceleration patterns of a moving object, such as a screen displaying content, up to a certain frequency and amplitude, thus managing to maintain proper focus on desired parts of the screen. Hence, a person gazing at a screen for viewing content is able to maintain readability up to a certain frequency and amplitude of change in gaze.

In the present context, the term 'readability' relates to the ease with which a viewer can understand a text displayed on the screen. It encompasses 'legibility', which is a measure of how easily a reader can distinguish individual letters or characters from each other. More general, displayed content may include not only text but also other graphical objects such as images, pictures, buttons, icons, and the like.

Known solutions which address the issue of readability of devices comprising screens for displaying content are based on utilizing user settings for adjusting a font size which is used for displaying text or a zoom factor which is applied to enlarge parts of the content, or the entire content, displayed on the screen.

U.S. 2013/0009962 A1 discloses solutions for automatically adjusting displayed information by selecting font sizes or a zoom level based on settings relating to the user, such as the user's vision or age, as well as ambient light, screen settings, and the displayed information, e.g., foreground and background colors of the displayed information.

While known solutions take certain contextual or environmental circumstances such as ambient light into account, it is not assessed whether the user viewing content displayed on a screen of the device in fact suffers from inferior readability before adjusting the displayed content or information.

SUMMARY

It is an object of the invention to provide an improved alternative to the above techniques and prior art.

More specifically, it is an object of the invention to provide an improved solution for improving the readability of content which is displayed to a viewer, e.g., text or other graphical objects which is/are displayed on the screen of a handheld device, such as a smartphone, or a device mounted in a vehicle.

These and other objects of the invention are achieved by means of different aspects of the invention, as defined by the independent claims. Embodiments of the invention are characterized by the dependent claims.

According to a first aspect of the invention, a device for improving readability of content displayed to a viewer is provided. The device comprises a screen for displaying the content to the viewer, a motion sensor for measuring a displacement of the device, and an eye tracker for measuring a change in gaze of the viewer when gazing at the screen. The device is operative to adjust the displayed content so as to improve the readability of the displayed content. The displayed content is adjusted in response to determining that the change in gaze and the displacement of the device are out-of-sync.

According to a second aspect of the invention, a method of improving readability of content displayed to a viewer is provided. The method is performed by a device and comprises measuring a displacement of the device, measuring a change in gaze of the viewer when gazing at a screen comprised in the device, and adjusting the displayed content so as to improve the readability of the displayed content. The displayed content is adjusted in response to determining that the change in gaze and the displacement of the device are out-of-sync.

According to a third aspect of the invention, a computer program is provided. The computer program comprises computer-executable instructions for causing a device to perform the method according to an embodiment of the second aspect of the invention, when the computer-executable instructions are executed on a processing unit comprised in the device.

According to a fourth aspect of the invention, a computer program product is provided. The computer program product comprises a computer-readable storage medium which has the computer program according to the third aspect of the invention embodied therein.

The invention makes use of an understanding that an improved user experience for users of devices having screens for displaying content is achieved, if measures for adjusting the displayed content for the purpose of enhancing the readability of the displayed content are only taken in response to detecting an actual deterioration in readability as experienced by the viewer, i.e., the person or user gazing at the screen of the device. As is described herein, embodiments of the invention adjust the displayed content in response to determining that the measured change in gaze of the viewer and the measured displacement of the device are out-of-sync.

The invention is based on the understanding that the human eye is able to follow displacements of an object up to a certain frequency and/or amplitude, with a certain phase difference which is dependent on frequency. Typically, the change in gaze lags behind the displacement of the device, as the eyes attempt to remain focused on the content displayed on the screen. In other words, the viewer's eye or eyes try to stay in-sync with the device when being displaced. If the eye or eyes of the viewer cannot cope following the displacement of the device, e.g., because of a large device acceleration or an increase in frequency of the device's vibration in the case of a repetitive or quasi-periodic displacement, the eye or eyes of the viewer lag behind the displacement of the device to such an extent that focus on the displayed content can no longer be maintained. As a result, the change in gaze of the viewer and the displacement of the device are out-of-sync. In such scenario, readability may be negatively affected to an extent which makes it impossible for the viewer to understand displayed text or interpret displayed content other than text.

It is to be understood that, in order to assess whether the change in gaze and the displacement of the device are in-sync or out-of-sync, the change in gaze and the displacement of the device need to be measured repeatedly, and preferably periodically or continuously, resulting in time-dependent signals, i.e., time-series of data for the gaze, or the change thereof, and the position of the device, or the change thereof, respectively.

Embodiments of the invention are particularly advantageous for devices which are designed for handheld operation, such as mobile phones, smartphones, tablet computers or tablets, gaming consoles, media players, and laptops, as well as devices comprising screens which are mounted in vehicles, e.g., in the dashboard of a car. This is the case since these classes of devices are subject to accelerations, shocks, or sudden displacement, while being gazed at.

According to an embodiment of the invention, it is determined that the change in gaze and the displacement of the device are out-of-sync by deriving a phase difference between the measured change in gaze and the measured displacement of the device, and determining that the change in gaze and the displacement of the device are out-of-sync if the derived phase difference, in particular an absolute value thereof, exceeds a threshold value. The threshold value may either be configured by a user of the device or learned, as is described further below.

According to an embodiment of the invention, it is determined that the change in gaze and the displacement of the device are out-of-sync by measuring at least one of an amplitude and a frequency of the displacement of the device, and determining that the change in gaze and the displacement of the device are out-of-sync if the measured amplitude of the displacement of the device exceeds a corresponding threshold value, the measured frequency of the displacement of the device exceeds a corresponding threshold value, or a combination of both.

According to an embodiment of the invention, the displayed content is adjusted so as to improve readability by at least one of increasing a font size of displayed text, enlarging one or more displayed graphical objects, and increasing a zoom level of the displayed content.

According to an embodiment of the invention, the change in gaze of the viewer is measured by image processing a series of images captured by a camera which is configured for imaging the eye or eyes of the viewer. In particular, this may be a camera which is mounted on the same face of the device as the screen, i.e., a front-facing camera.

According to an embodiment of the invention, the change in gaze of the viewer is measured by detecting infra-red light using an infra-red light detector which is comprised in the device. The infra-red light is originating from an infra-red light source comprised in the device and being reflected by the eye or eyes of the viewer. By analyzing changes in the detected reflections it is possible to extract information about eye rotation, and thereby a change in gaze.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

Figure 1:
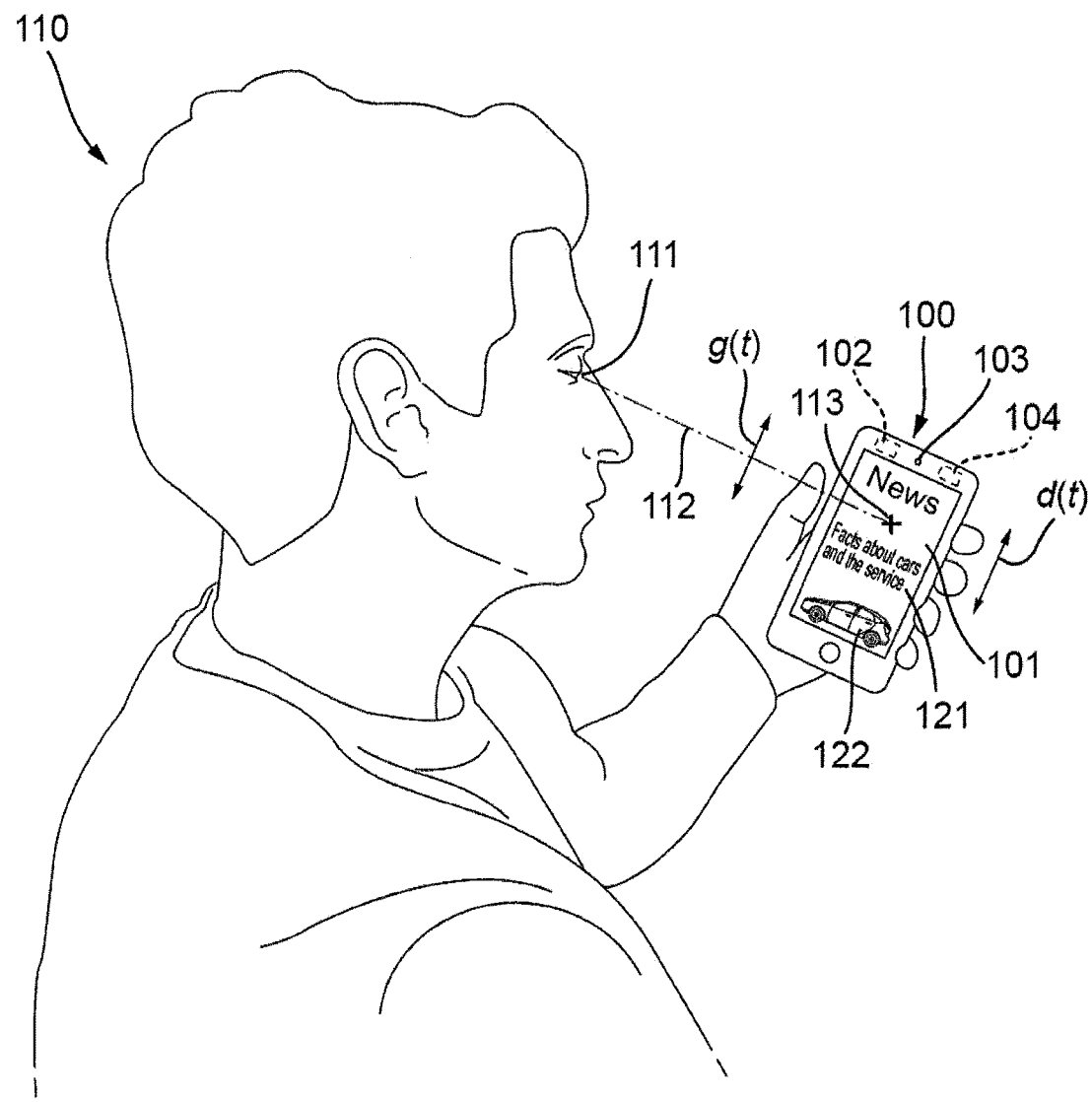
FIG. 1 illustrates a device for improving readability of content displayed to a viewer, in accordance with an embodiment of the invention.

In FIG. 1, an embodiment 100 of the device for improving readability of content displayed to a viewer 110 is shown. Whereas device 100 in FIG. 1 is illustrated as a smartphone, i.e., a device for handheld operation, it will be appreciated that the invention may alternatively be embodied in other types of devices such as tablets, gaming consoles, media players, and laptops, or in devices which are mounted in a vehicle, e.g., in or on the dashboard of a car. These types of devices are characterized by being subjected to sudden accelerations, e.g., because the user of a handheld device is walking or riding a bus, in response to which they are displaced relative to viewer 110, or rather the viewer's eye(s) 111. Such displacements necessitate a change in gaze 112, i.e., the direction into which viewer 110 is looking.

Device 100 comprises a screen 101 for displaying content to viewer 110, e.g., text 121, an image 122, or other content such as user-interface elements (buttons and keys). Device 100 further comprises a motion sensor 102 for measuring a displacement of device 100, and an eye tracker 103 for measuring a change in gaze 112 of viewer 110 when gazing at screen 101. It will be appreciated that embodiments of device 100 measure the displacement of device 100 and the change in gaze 112 repeatedly, and preferably periodically or continuously. Optionally, the displacement of device 100 and/or the change in gaze 112 are only measured when it is assessed to be likely that the readability of content 121/122 displayed on screen 101 is at risk. Such an assessment may, e.g., be based on contextual and/or environmental data such as ambient light or sudden accelerations detected by motion sensor 102 or any other sensor comprised in device 100.

Motion sensor 102 may be based on any type of sensor which is suitable for measuring a displacement of device 100, e.g., an accelerometer, a gyroscope, a magnetometer, a pedometer, and the like. The output of motion sensor 102 is a time-dependent signal, i.e., a time-series of data d(t), reflecting the displacement of device 100. Embodiments of device 100 may utilize scalar displacement values d(t) reflecting displacement along a current direction of displacement. Alternatively, a time-series of pairs of scalar values may be utilized, e.g., pairs of values reflecting the displacement of device 100 within a plane defined by screen 101. As yet a further alternative, a time-series of triplets of scalar values, i.e., vectors, may be utilized, reflecting the current displacement of device 100 in three-dimensional space.

Eye tracker 103 may utilize a camera comprised in device 100 which is configured for imaging the eye 111 or eyes of viewer 110, such as a front-facing camera 103 which most modern smartphones and tablets are provided with, for measuring the change in gaze 112. This may be achieved by image processing a series of images captured by camera 103, as is known in the art. As an example, U.S. 2015/0002392 A1 and U.S. 2015/0346818 A1 disclose solutions for eye tracking and detecting micro eye movements based on images captured with a mobile device, such as a smartphone. As an alternative, eye tracker 103 may comprise an infra-red light source and an infra-red light detector. In this case, the change in gaze 112 of viewer 110 is measured based on infra-red light originating from the infra-red light source, which infra-red light is reflected by the eye 111 or eyes of viewer 110 and subsequently detected by the infra-red light detector. Based on the measured changes in reflections over time, information about eye rotation and the related change in gaze 112 may be extracted, as is known in the art. The output of eye tracker 103 is a time-dependent signal, i.e., a time-series of scalar values g(t) reflecting the change in gaze 112 of viewer 110. The time-series of data g(t) may, e.g., reflect an angle of the direction of gaze 112 relative to a reference axis defined in relation to the head of viewer 110, or a change thereof. Alternatively, the time-series of data g(t) may reflect a change in the point of gaze 113, i.e., the point of focus of the eye(s) 111 of viewer 110 on screen 101.

Figure 2:
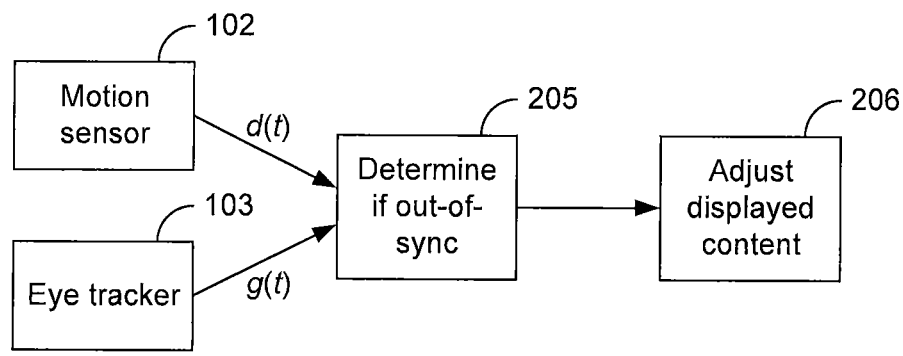
FIG. 2 schematically illustrates improving readability of content displayed to a viewer, in accordance with embodiments of the invention.

As is schematically illustrated in FIG. 2, device 100 is operative to determine 205 that the change in gaze 112 and the displacement of device 100 are out-of-sync and, in response thereto, adjust 206 the displayed content 121/122 so as to improve its readability. The determination 205 that the change in gaze 112 and the displacement of device 100 are out-of-sync may be achieved in a number of ways. For instance, device 100 may be operative to determine 205 that the change in gaze 112 and the displacement of device 100 are out-of-sync by deriving a phase difference p(t) between the change in gaze g(t), measured by eye tracker 103, and the displacement d(t) of the device, measured by motion sensor 102. Then, it is determined 205 that the change in gaze 112 and the displacement of device 100 are out-of-sync if the derived phase difference p(t), or an absolute value thereof, |p(t)|, exceeds a threshold value for a maximal phase difference.

The phase difference p(t) may be derived by any known method which is suitable for establishing the instantaneous phase difference between two time-dependent signals. As an example, this may be accomplished by calculating the Hilbert transform for each of the signals d(t) and g(t), i.e., $$H(d)(t) = \frac{1}{\pi} p.v. \int_{-\infty}^{+\infty} \frac{d(\tau)}{t-\tau} d\tau$$

and $$H(g)(t) = \frac{1}{\pi} p.v. \int_{-\infty}^{+\infty} \frac{g(\tau)}{t-\tau} d\tau,$$

respectively, where "p.v." denotes the Cauchy principal value. The Hilbert transform is commonly known in the field of signal processing where it is used for deriving an analytic expression of a signal, thereby extending the signal into the complex plane. For a discrete function, such as a time-series of measured values, the discrete Hilbert transform is typically used.

Subsequent to calculating the Hilbert transforms H(d)(t) and H(g)(t) for the measured signals d(t) and g(t), their respective instantaneous phase angles can be extracted. This may, e.g., be achieved by utilizing a polar representation of the complex Hilbert transforms, in which a complex number $z=x+yi$ is expressed using its absolute value $|z|=\sqrt{x^2+y^2}$ and its argument $\phi$, commonly referred to as 'phase', as $z=|z|e^{i\phi}$.

Finally, the instantaneous phase difference p(t) between the change in gaze 112 and the displacement of device 100 can be calculated as the difference between the instantaneous phase angle $p_d(t)$ of the measured displacement d(t) and the instantaneous phase angle $p_g(t)$ of the measured change in gaze g(t):

$$p(t)=p_g(t)-p_d(t).$$

The derived phase difference p(t) may be expressed in the units of degree or radians.

Figure 3:
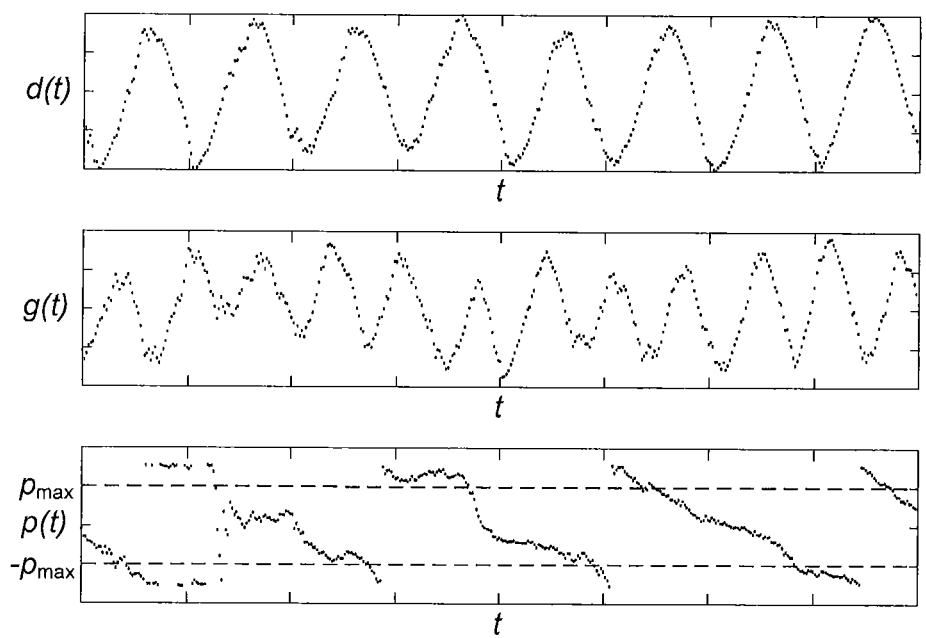
FIG. 3 exemplifies a measured displacement of a device for improving readability of content displayed to a viewer, the corresponding measured change in gaze, and the derived phase difference, in accordance with embodiments of the invention.

The process of determining that the change in gaze 112 and the displacement of device 100 are out-of-sync based on the instantaneous phase difference between signals g(t) and d(t) is exemplified by means of simulated signals shown in FIG. 3.

The upper diagram in FIG. 3 illustrates a possible displacement of device 100 by means of a time-series of data d(t), which may reflect the time-dependent displacement of device 100 as a scalar value having a unit of length. The middle diagram in FIG. 3 illustrates a corresponding simulated change in gaze 112 by means of a time-series of data g(t), reflecting the change in direction of gaze 112 relative to a reference axis, or the change in point of gaze 113, as a scalar value having a unit of angle or length, respectively. By calculating the (discrete) Hilbert transforms and extracting the instantaneous phases for each of these signals, the instantaneous phase difference p(t) is obtained, which is shown in the lower diagram in FIG. 3.

Based on the derived phase difference p(t), it may be determined whether the measured change in gaze 112 and the measured displacement of device 100 are out-of-sync by comparing the phase difference p(t) to a threshold value $p_{max}$. More specifically, if the instantaneous phase difference p(t) exceeds $p_{max}$, if p(t) is positive, or is less than $-p_{max}$, if p(t) is negative, it is determined that the measured change in gaze 112 and the measured displacement of device 100 are out-of-sync, and the displayed content 121/122 is adjusted accordingly. With reference to the lower diagram in FIG. 3, this is the case during time periods when the derived phase difference p(t) is outside the range indicated by the dashed lines. The condition for the phase difference p(t) may alternatively be expressed in terms of its absolute value |p(t)|, as follows: if the absolute value of the instantaneous phase difference |p(t)| exceeds $P_{max}$, it is determined that the measured change in gaze 112 and the measured displacement of device 100 are out-of-sync, and the displayed content 121/122 is adjusted accordingly.

The threshold value $p_{max}$ for the derived phase difference may either be configured by a user of device 100 or learned. For instance, if a user of device 100 repeatedly stops gazing at screen 101 when the derived phase difference p(t) has reached about the same value, it may be concluded that the user stops viewing content 121/122 which is displayed on screen 101 for the reason that the readability has deteriorated to an extent which makes reading impossible. By storing a history of values for the instantaneous phase difference when the viewer stops gazing at screen 101, a suitable threshold value $p_{max}$ for the derived phase difference may be established as an average value, a lower bound, or by performing a statistical analysis of the stored values.

As is known in the field of signal processing, in order to derive the phase difference p(t) as is described hereinbefore, signals g(t) and d(t) may need to be filtered so as remove noise and limit the range of frequency components present in the signals. In practice, this may be achieved by applying Finite Impulse Response (FIR) filters or Infinite Impulse Response (IIR) filters to signals g(t) and d(t).

An alternative to deriving the phase difference by means of Hilbert transforms, a phase detector or phase comparator may be employed, as is known in the art. These may be implemented as analog circuits which generate a voltage signal representing the phase difference between two signals. The so-called type-II phase detector is sensitive only to the relative timing of the edges of the input signals and produces a constant output proportional to the phase difference when both signals are at the same frequency.

As an alternative way of determining that the change in gaze 112 and the displacement of device 100 are out-of-sync, device 100 may be operative to measure at least one of an amplitude and a frequency of the displacement of device 100, and determining that the change in gaze 112 and the displacement of device 100 are out-of-sync if at least one of the measured amplitude and the measured frequency of the displacement of the device exceeds a corresponding threshold value. In this case, rather than establishing that the change in gaze 112 and the displacement of device 100 are out-of-sync by deriving the phase difference between two signals, g(t) and d(t), parameters characterizing the displacement of device 100 are used as indicator for an out-of-sync condition. In practice, the amplitude and/or frequency of the displacement of device 100 may be extracted from the measured displacement d(t). The threshold values for amplitude and/or frequency may either be configured by a user of device 100 or learned. For instance, similar to what is described above, by storing a history of values for the amplitude and/or frequency when the viewer stops gazing at screen 101, suitable threshold values may be established as average values, lower bounds, or by performing a statistical analysis of the stored values.

Device 100 may be operative to adjust the displayed content 121/122 so as to improve readability by at least one of increasing a font size of displayed text 121, enlarging one or more displayed graphical objects, such as picture 122, and increasing a zoom level of the displayed content. The zoom level may either be increased for the entire displayed content or for parts of the content. The latter may be achieved by using an effect which resembles a magnifying glass, as is known in the art. If the entire displayed content is enlarged by applying a zoom level, point of gaze 113 is preferably used as a fixed point so as to avoid shifting the part of the displayed content which viewer 110 gazes at.

Optionally, if the phase difference p(t) between the measured change in gaze 112 and the measured displacement of device 100 is derived, the displayed content may be adjusted gradually with increasing derived phase difference. For instance, an increase in font size or a zoom factor which is applied to the displayed content may be dependent on the extent to which the derived phase difference p(t) exceeds the threshold value $p_{max}$. As an example, this may be achieved by selecting an increase in font size or a zoom factor which is proportional to $(|p(t)|-p_{max})$.

Further optionally, device 100 may be operative to adjust the displayed content 121/122 in response to determining that the change in gaze 112 and the displacement of device 100 have been out-of-sync for a specified period of time. Thereby, rapid changes in the displayed content are avoided in situations where the derived phase difference p(t) oscillates around the threshold value $p_{max}$.

Device 100 may further be operative adjust the displayed content 121/122 based on settings configured by a user of device 100. These settings may, e.g., define minimum values, maximum values, preferred values, or the like, for a zoom level, font sizes, and so forth. Further optionally, the content may be adjusted based on other criteria such as ambient light, contrast or brightness settings of screen 101, or the displayed content 121/122, such as fore- and background colors.

The above described behavior of device 100 may be implemented by means of processing means 104 comprised in device 100. Embodiments of processing means 104 are described in the following, with reference to FIGS. 4 and 5.

Figure 4:
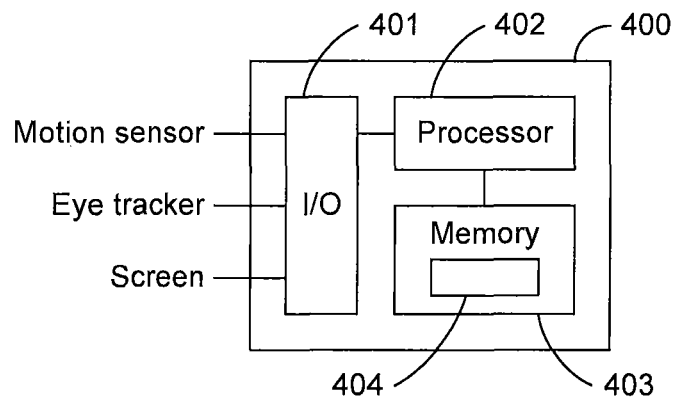
FIG. 4 shows an embodiment of the processing means comprised in the device for improving readability of content displayed to a viewer.

In FIG. 4, a first embodiment 400 of processing means 104 is illustrated. Processing means 400 comprises a processing unit 402, such as a general purpose processor, and a computer-readable storage medium 403, such as a Random Access Memory (RAM), a Flash memory, or the like. In addition, processing means 400 comprises one or more interfaces 401 ('I/O' in FIG. 4) for controlling and/or receiving information from motion sensor 102, eye tracker 103, such as a front-facing camera, and screen 101. In particular, interface(s) 401 may be arranged for receiving time-series of data d(t) and g(t), reflecting the displacement of device 100 and the change in gaze 112, respectively, or information from which d(t) and g(t) can be derived. For instance, if the change in gaze 112 is measured by image processing a series of images captured by camera 103, these images may be received via interface(s) 401 and image processed by processing means 400 so as to derive the change in gaze g(t). Memory 403 contains computer-executable instructions 404, i.e., a computer program, for causing device 100 to perform in accordance with embodiments of the invention as described herein, when computer-executable instructions 404 are executed on processing unit 402.

Figure 5:
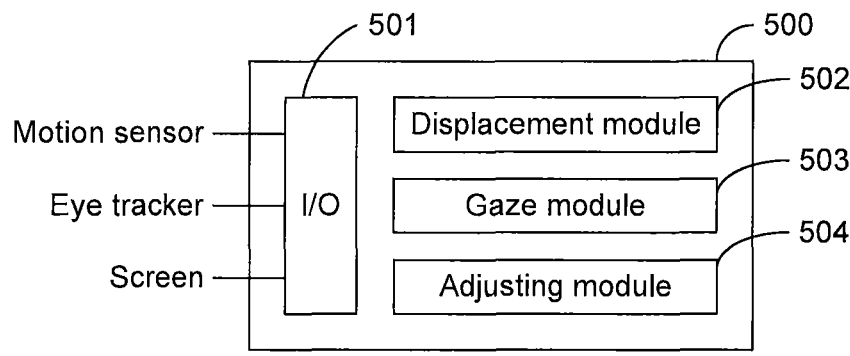
FIG. 5 shows another embodiment of the processing means comprised in the device for improving readability of content displayed to a viewer.

In FIG. 5, an alternative embodiment 500 of processing means 104 is illustrated. In correspondence with processing means 400, processing means 500 comprises one or more interfaces 501 ('I/O' in FIG. 5) for controlling and/or receiving information from motion sensor 102, eye tracker 103, such as a front-facing camera, and screen 101. Processing means 500 further comprises a displacement module 502, a gaze module 503, and an adjusting module 504, which are configured to perform in accordance with embodiments of the invention as described herein. In particular, displacement module 502 is configured for measuring a displacement of device 100, gaze module 503 is configured for measuring a change in gaze 112 of viewer 110 when gazing at screen 101, and adjustment module 504 is configured for adjusting, in response to determining that the change in gaze 112 and the displacement of device 100 are out-of-sync, content displayed on screen 101 so as to improve its readability.

Interface(s) 401 and 501, and modules 502-504, as well as any additional modules comprised in processing means 500, may be implemented by any kind of electronic circuitry, e.g., any one, or a combination of, analogue electronic circuitry, digital electronic circuitry, and processing means executing a suitable computer program.

In the following, embodiments of the method of improving readability of content displayed to a viewer are described with reference to FIG. 6.

Method 600 comprises measuring 601 a displacement of the device, measuring 602 a change in gaze of the viewer when gazing at a screen comprised in the device, and, in response to determining that the change in gaze and the displacement of the device are out-of-sync, adjusting 605 the displayed content so as to improve the readability of the displayed content.

Figure 6:
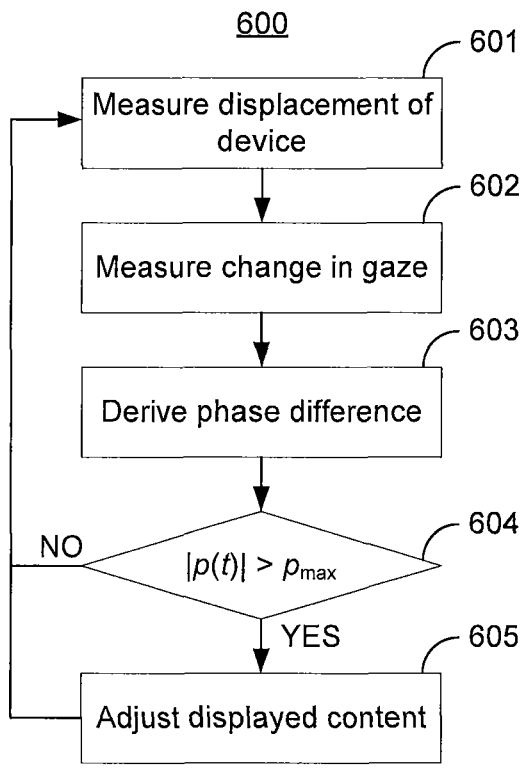
FIG. 6 shows a flow chart illustrating a method of improving readability of content displayed to a viewer, in accordance with an embodiment of the invention.

As is shown in FIG. 6, the determining that the change in gaze and the displacement of the device are out-of-sync may, e.g., comprise deriving 603 a phase difference between the measured change in gaze and the measured displacement of the device, and determining 604 that the change in gaze and the displacement of the device are out-of-sync if the derived phase difference exceeds a threshold value. As an alternative, the determining that the change in gaze and the displacement of the device are out-of-sync may comprise measuring at least one of an amplitude and a frequency of the displacement of the device, and determining that the change in gaze and the displacement of the device are out-of-sync if at least one of the measured amplitude and the measured frequency of the displacement of the device exceeds a corresponding threshold value.

It will be appreciated that method 600 may comprise additional, or modified, steps in accordance with what is described throughout this disclosure. Method 600 may be performed by a device for handheld operation, e.g., a mobile phone, a smartphone, a tablet, a gaming console, a media player, and a laptop, or by a device mounted in a vehicle, e.g., in or on the dashboard of a car. An embodiment of method 600 may be implemented as software, such as computer program 404, to be executed by a processing unit comprised in the device, whereby the device is operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A device for improving readability of content displayed to a viewer, comprising:
   a screen for displaying the content to the viewer,
   a motion sensor for measuring a displacement of the device and
   an eye tracker for measuring a change in gaze of the viewer when gazing at the screen,
   the device comprising at least one processor being configured to,
   determine that the change in gaze and the displacement of the device are out-of-sync by operations comprising:
      deriving a phase difference between the measured change in gaze and the measured displacement of the device, and
      determining that the change in gaze and the displacement of the device are out-of-sync if the derived phase difference exceeds a threshold value, and
   in response to determining that the change in gaze and the displacement of the device are out-of-sync, adjust the displayed content so as to improve the readability of the displayed content.

2. The device according to claim 1, wherein the at least one processor is further being configured to adjust the displayed content gradually responsive to increasing derived phase difference.

3. The device according to claim 1, wherein the at least one processor is further being configured to determine that the change in gaze and the displacement of the device are out-of-sync by further operations comprising:
   measuring at least one of an amplitude and a frequency of the displacement of the device, and
   determining that the change in gaze and the displacement of the device are out-of-sync if at least one of the measured amplitude and the measured frequency of the displacement of the device exceeds a corresponding threshold value.

4. The device according to claim 1, wherein the at least one processor is further being configured to adjust the displayed content in response to determining that the change in gaze and the displacement of the device have been out-of-sync for a specified period of time.

5. The device according to claim 1, wherein the at least one processor is further being configured to adjust the displayed content so as to improve readability by at least one of increasing a font size of displayed text, enlarging one or more displayed graphical objects, and increasing a zoom level of the displayed content.

6. The device according to claim 1, wherein the eye tracker comprises a camera configured for imaging the eye or eyes of the viewer, wherein the at least one processor is further being configured to measure the change in gaze of the viewer by image processing a series of images captured by the camera.

7. The device according to claim 6, wherein the camera is mounted on the same face of the device as the screen.

8. The device according to claim 1, wherein the eye tracker comprises an infra-red light source and an infra-red light detector, wherein the at least one processor is further being configured to measure the change in gaze of the viewer based on infra-red light originating from the infra-red light source and being reflected by the eye or eyes of the viewer and detected by the infra-red light detector.

9. The device according to claim 1, being a device for handheld operation.

10. The device according to claim 1, being one of a mobile phone, a smartphone, a tablet, a gaming console, a media player, and a laptop.

11. The device according to claim 1, being mounted in a vehicle.

12. The device according to claim 1, wherein:
wherein the at least one processor is further configured to generate the threshold value based on measurements of the determined phase difference that are determined to be associated with when one or more viewers chooses to cease gazing at content displayed on the viewer.

13. A method of a device, of improving readability of content displayed to a viewer, the method comprising:
obtaining a measurement of a displacement of the device,
obtaining a measurement of a change in gaze of the viewer when gazing at a screen comprised in the device,
determining that the change in gaze and the displacement of the device are out-of-sync by operations comprising
deriving a phase difference between the measured change in gaze and the measured displacement of the device, and
determining that the change in gaze and the displacement of the device are out-of-sync if the derived phase difference exceeds a threshold value, and
in response to determining that the change in gaze and the displacement of the device are out-of-sync, adjusting the displayed content so as to improve the readability of the displayed content.

14. The method according to claim 13, wherein the displayed content is adjusted gradually responsive to increasing derived phase difference.

15. The method according to claim 13, wherein the determining that the change in gaze and the displacement of the device are out-of-sync comprises:
measuring at least one of an amplitude and a frequency of the displacement of the device, and
determining that the change in gaze and the displacement of the device are out-of-sync if at least one of the measured amplitude and the measured frequency of the displacement of the device exceeds a corresponding threshold value.

16. The method according to claim 13, wherein the displayed content is adjusted in response to determining that the change in gaze and the displacement of the device have been out-of-sync for a specified period of time.

17. The method according to claim 13, wherein the adjusting the displayed content so as to improve readability comprises at least one of increasing a font size of displayed text, enlarging one or more displayed graphical objects, and increasing a zoom level of the displayed content.

18. The method according to claim 13, wherein the obtaining the measurement of the change in gaze of the viewer comprises image processing a series of images captured by a camera comprised in the device and being configured for imaging the eye or eyes of the viewer.

19. The method according to claim 18, wherein the camera is mounted on the same face of the device as the screen.

20. The method according to claim 13, wherein the obtaining the measurement of the change in gaze of the viewer comprises detecting infra-red light by an infra-red light detector comprised in the device, which infra-red light is originating from an infra-red light source comprised in the device and being reflected by the eye or eyes of the viewer.

21. The method according to claim 13, wherein the device is a device for handheld operation.

22. The method according to claim 13, wherein the device is one of a mobile phone, a smartphone, a tablet, a gaming console, a media player, and a laptop.

23. The method according to claim 13, wherein the device is mounted in a vehicle.

24. The method according to claim 13, further comprising:
generating the threshold value based on measurements of the determined phase difference that are determined to be associated with when one or more viewers chooses to cease gazing at content displayed on the viewer.

25. A computer program product comprising a non-transitory computer readable storage medium storing instructions that when executed by a processor of a device cause the device to perform operations comprising:
obtaining a measurement of a displacement of the device,
obtaining a measurement of a change in gaze of a viewer when gazing at a screen comprised in the device,
determining that the change in gaze and the displacement of the device are out-of-sync by operations comprising
deriving a phase difference between the measured change in gaze and the measured displacement of the device, and
determining that the change in gaze and the displacement of the device are out-of-sync if the derived phase difference exceeds a threshold value, and
in response to determining that the change in gaze and the displacement of the device are out-of-sync, adjusting the displayed content so as to improve the readability of the displayed content.

26. The computer program product according to claim 25, wherein the operations further comprise:
generating the threshold value based on measurements of the determined phase difference that are determined to be associated with when one or more viewers chooses to cease gazing at content displayed on the viewer.

* * * * *